(12) United States Patent
Bauchot et al.

(10) Patent No.: US 8,212,651 B2
(45) Date of Patent: Jul. 3, 2012

(54) USE OF RADIO FREQUENCY IDENTIFIER (RFID) TAGS FOR IDENTIFICATION OF AN AUTHENTICATION STATUS OF AN ITEM

(75) Inventors: Frederic Bauchot, Saint-Jeannet (FR); Jean-Yves Clement, Saint-Jeannet (FR); Gerard Marmigere, Drap (FR); Pierre Secondo, Tourrettes-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 1053 days.

(21) Appl. No.: 12/096,044

(22) PCT Filed: Oct. 16, 2006

(86) PCT No.: PCT/EP2006/067458
§ 371 (c)(1),
(2), (4) Date: Jun. 4, 2008

(87) PCT Pub. No.: WO2007/068519
PCT Pub. Date: Jun. 21, 2007

(65) Prior Publication Data
US 2009/0045911 A1  Feb. 19, 2009

(30) Foreign Application Priority Data
Dec. 15, 2005  (EP) .................................... 05301063

(51) Int. Cl.
*G05B 19/00* (2006.01)
*G05B 23/00* (2006.01)
*G06F 7/00* (2006.01)
*G06F 7/04* (2006.01)

(52) U.S. Cl. ....... 340/5.8; 340/5.26; 340/5.86; 380/232; 705/67

(58) Field of Classification Search ................. 340/5.26, 340/5.8, 5.56, 5.86; 380/232; 705/67; 726/32
See application file for complete search history.

(56) References Cited

U.S. PATENT DOCUMENTS

| 6,226,619 B1 | 5/2001 | Halperin et al. |
| 2003/0159036 A1 | 8/2003 | Walmsley et al. |
| 2005/0151617 A1 | 7/2005 | Nakazawa |

FOREIGN PATENT DOCUMENTS

JP  PUPA2006-195799  7/2006

(Continued)

OTHER PUBLICATIONS

Ranasinghe et al.; Security and Privacy Solutions for Low-Cost RFID Systems; Dec. 14, 2004 Intelligent Sensors, Sensor Networks and Information Processing Conference, 2004; Proceedings of the 2004 Melbourne, Australia Dec. 14-17, 2004, Piscaway, NY, USA, IEEE, pp. 337-342, XP010783788; the whole document.

(Continued)

*Primary Examiner* — Daniel Wu
*Assistant Examiner* — Frederick Ott
(74) *Attorney, Agent, or Firm* — Schmeiser, Olsen & Watts; John Pivnichny (57) ABSTRACT

A method and system for identifying an authentication status of a first item. An RFID reader transmits zero and a random number to a first RFID tag associated with the first item. The first RFID tag uses a hashing function to compute a hash (H1) of a concatenation of an identifier (Id1) of the first RFID tag, the random number, and a first secret key and sends the hash H1 to the RFID reader which then transmits the identifier Id1 and the random number to a second RFID tag. The second RFID tag uses the hashing function to compute a hash (H2) of a concatenation of the identifier Id1, the random number, and a second secret key and sends the hash H2 to the RFID reader. The authentication status of authentic or counterfeit is determined for the first item based on whether or not H1 is equal to H2.

20 Claims, 3 Drawing Sheets

FOREIGN PATENT DOCUMENTS

| WO | WO99/04364 | 1/1999 |
|---|---|---|
| WO | WO2004/089017 A1 | 10/2004 |

OTHER PUBLICATIONS

Staake et al.; Extending the EPC Network—The Potential of RFID in Anti-Counterfeiting; Mar. 13, 2005, Proceedings ACM Symposium on Applied Computing, pp. 1607-1612, XP002397697; p. 1609, left-hand column, paragraph 5; p. 1611, right-hand column, paragraph 1.

Sangshin Lee et al.; "RFID Mutual Authentication Scheme based on Synchronized Secret Information"; SCIS 2006—The 2006 Symposium on Cryptography and Information Security, Hiroshima, Japan, Jan. 17-20, 2006 The Institute of Electronics, Information and Communication Engineers; pp. 1-18.

USE OF RADIO FREQUENCY IDENTIFIER (RFID) TAGS FOR IDENTIFICATION OF AN AUTHENTICATION STATUS OF AN ITEM

FIELD OF THE INVENTION

The present invention relates generally to method and systems for preventing counterfeiting of items and more specifically to method and systems using RFID for authenticating items by comparing the item to be authenticated with a similar genuine item.

BACKGROUND OF THE INVENTION

Conventional method and apparatus exist for making it difficult to counterfeit high value items such as are wines and perfumes, or documents such as official documents and financial document. A basic concept to assure that the item is genuine requires a form of verification of the item, such as identifiers to confirm the items as being genuine. For example, U.S. Patent Application 2004/0000987 discloses a process for detecting check fraud using Radio Frequency Identifier (RFID) tags. According to this invention, the system comprises a first device for receiving from a payor a request to create a check having a radio frequency identifier (RFID) tag associated therewith. A second device is provided for receiving from a payee a request to validate a check having an RFID tag associated therewith. The system further comprises an RFID repository. A processor is provided for (i) receiving check information from the payor, (ii) updating the RFID repository with check information received from the payor, (iii) receiving scanned check information from the payee, (iv) comparing the scanned check information received from the payee with certain information retrieved from the RFID repository, and (v) determining if the check is valid based upon the comparison of the scanned check information received from the payee with the certain information retrieved from the RFID repository. Preferably, the RFID repository comprises a central RFID repository. Likewise, U.S. Pat. No. 6,226,619 discloses a method and system for preventing counterfeiting of an item, including an interrogatable tag attached to the item. The item includes visible indicia for comparison with secret, non-duplicable information stored in the tag designating authenticity.

According to these methods and systems, it is possible to ensure that a given document has been issued by the relevant person, or that an item has been manufactured by the relevant manufacturer, or that a given official document has been issued by the relevant administration. As mentioned above, these methods and systems are based upon identifiers encoded within the RFIDs however, such identifiers can be duplicated on other RFIDs using a RFID scanner and writer.

Therefore, there is a need for a method and systems for improving authentication.

SUMMARY OF THE INVENTION

Thus, it is a broad object of the invention to remedy the shortcomings of the prior art as described here above.

It is another object of the invention to provide an improved method and systems for ascertaining that an item has been produced, issued, or manufactured by the administration, the person, or the manufacturer entitled to do so, using a radio frequency tag identifier.

It is a further object of the invention to provide an improved method and systems for ascertaining that an item has been produced, issued, or manufactured by the administration, the person, or the manufacturer entitled to do so, by comparing the item to be authenticate with a similar genuine item, using a radio frequency tag identifier.

It is still a further object of the invention to provide an improved method and systems for ascertaining that an item has been produced, issued, or manufactured by the administration, the person, or the manufacturer entitled to do so, using a radio frequency tag identifier that content is hardly duplicable.

The accomplishment of these and other related objects is achieved by a RFID for authenticating an item to which said RFID is associated, said RFID having a memory storing an identifier and a secret key, and a built-in hashing function, said RFID being adapted for, receiving a check command comprising two arguments a and b;

setting the value of said parameter a to the value of said identifier if said parameter a is received equal to zero;

concatenating said arguments a and b with said secret key in a variable C;

computing the result H of said built-in hashing function having said variable C as input; and, transmitting the value of said identifier and said result H, and by a method for authenticating a first item comprising an RFID as described above, using the reference and the RFID of a second item, said RFID of said second item being as described above and said second item being a genuine item, said method comprising the steps of, generating a random number;

transmitting a first request with zero and said random number R as arguments, to said first item;

receiving two values in response to said first request from said first item;

transmitting a second request with the first of said two values and said random number as arguments, to the RFID of said second item;

receiving two values in response to said second request from the RFID of said second item;

comparing the second values of said two values received from said first item and said RFID of said second items.

Further embodiments of the invention are provided in the appended dependent claims.

Further advantages of the present invention will become apparent to the ones skilled in the art upon examination of the drawings and detailed description. It is intended that any additional advantages be incorporated herein.

BRIEF DESCRIPTION OF THE DRAWINGS

FIG. 2 comprises FIGS. 2a and 2b.

DETAILED DESCRIPTION OF THE PREFERRED EMBODIMENT

According to the invention, a Radio Frequency IDentifier (RFID) tag is embedded within the item to authenticate. Such RFID is preferably a short reading distance range RFID e.g., a RFID running at 13.56 MHZ. Each RFID comprises a memory for storing a unique identifier, such as an EPC, referred to as MyId in the following, a secret key, referred to as SK in the following, and a built-in function which returns a result H(x) when being fed by a variable x, where H(x) is the hashing of the input variable x according to an algorithm such as "The MD5 Message-Digest Algorithm", RFC 1321 from R.Rivest, or the "Secure Hash Algorithm 1", RFC 3174.

RFID Systems

The core of any RFID system is the 'Tag' or 'Transponder', which can be attached to or embedded within objects, wherein data can be stored. An RFID reader, generically referred to as reader in the following description, sends out a radio frequency signal to the RFID tag that broadcasts back its stored data to the reader. The system works basically as two separate antennas, one on the RFID tag and the other on the reader. The read data can either be transmitted directly to another system like a host computer through standard interfaces, or it can be stored in a portable reader and later uploaded to the computer for data processing. An RFID tag system works effectively in environments with excessive dirt, dust, moisture, and/or poor visibility. It generally overcomes the limitations of other automatic identification approaches.

Several kinds of RFID, such as piezoelectric RFID and electronic RFID, are currently available. For example, passive RFID tags do not require battery for transmission since generally, they are powered by the reader using an induction mechanism (an electromagnetic field is emitted by the reader antenna and received by an antenna localized on the RFID tag). This power is used by the RFID tag to transmit a signal back to the reader, carrying the data stored in the RFID tag. Active RFID tags comprise a battery to transmit a signal to a reader. A signal is emitted at a predefined interval or transmit only when addressed by a reader.

When a passive High Frequency (HF) RFID tag is to be read, the reader sends out a power pulse e.g., a 134.2 KHz power pulse, to the RFID antenna. The magnetic field generated is 'collected' by the antenna in the RFID tag that is tuned to the same frequency. This received energy is rectified and stored on a small capacitor within the RFID tag. When the power pulse has finished, the RFID tag immediately transmits back its data, using the energy stored within its capacitor as its power source. Generally, 128 bits, including error detection information, are transmitted over a period of 20 ms. This data is picked up by the receiving antenna and decoded by the reader. Once all the data has been transmitted, the storage capacitor is discharged, resetting the RFID tag to make it ready for the next read cycle. The period between transmission pulses is known as the 'sync time' and lasts between 20 ms and 50 ms depending on the system setup. The transmission technique used between the RFID tag and the reader is Frequency Shift Keying (FSK) with transmissions generally comprised between 124.2 kHz and 134.2 kHz. This approach has comparatively good resistance to noise while also being very cost effective to implement.

RFID tags can be read-only, write-once, or read-write. A read-only RFID tag comprises a read-only memory that is loaded during manufacturing process. Its content can not be modified. The write-once RFID tags differ from the read-only RFID tags in that they can be programmed by the end-user, with the required data e.g., part number or serial number. The read-write RFID tags allow for full read-write capability, allowing a user to update information stored in a tag as often as possible in the limit of the memory technology. Generally, the number of write cycles is limited to about 500,000 while the number of read cycles is not limited. A detailed technical analysis of RFID tag is disclosed e.g., in RFID (McGraw-Hill Networking Professional) by Steven Shepard, edition Hardcover.

Figure 1:
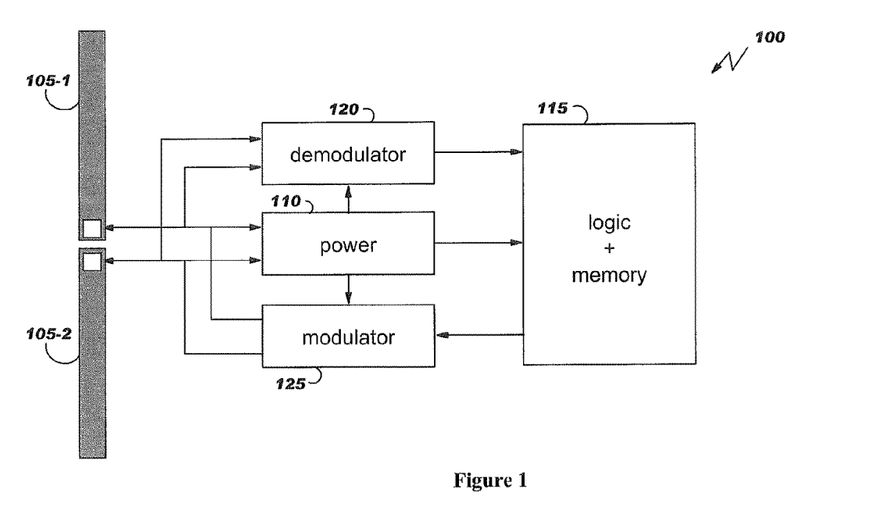
FIG. 1 depicts an example of the architecture of a passive RFID tag.

FIG. 1 depicts an example of the architecture of a passive HF or Ultra High Frequency (UHF) RFID tag 100. As shown, the dipole antenna comprising two parts 105-1 and 105-2 is connected to a power generating circuit 110 that provides current from received signal to the logic and memory circuit 115, to the demodulator 120, and to the modulator 125. The input of demodulator 120 is connected to the antenna (105-1 and 105-2) for receiving the signal and for transmitting the received signal to the logic and memory circuit 115, after having demodulated the received signal. The input of modulator 125 is connected to the logic and memory circuit 115 for receiving the signal to be transmitted. The output of modulator 125 is connected to the antenna (105-1 and 105-2) for transmitting the signal after it has been modulated in modulator 125.

The architecture of a semi-passive RFID tag is similar to the one represented on FIG. 1, the main difference being the presence of a power supply that allows it to function with much lower signal power levels, resulting in greater reading distances. Semi-passive tags do not have an integrated transmitter contrarily to active tags that comprise a battery and an active transmitter allowing them to generate high frequency energy and to apply it to the antenna.

As disclosed in "A basic introduction to RFID technology and its use in the supply chain", White Paper, Laran RFID, when the propagating wave from the reader collides with tag antenna in the form of a dipole, part of the energy is absorbed to power the tag and a small part is reflected back to the reader in a technique known as back-scatter. Theory dictates that for the optimal energy transfer, the length of the dipole must be equal to half the wave length, or $\lambda/2$. Generally, the dipole is made up of two $\lambda/4$ lengths. Communication from tag to reader is achieved by altering the antenna input impedance in time with the data stream to be transmitted. This results in the power reflected back to the reader being changed in time with the data i.e., it is modulated.

Figure 2A:
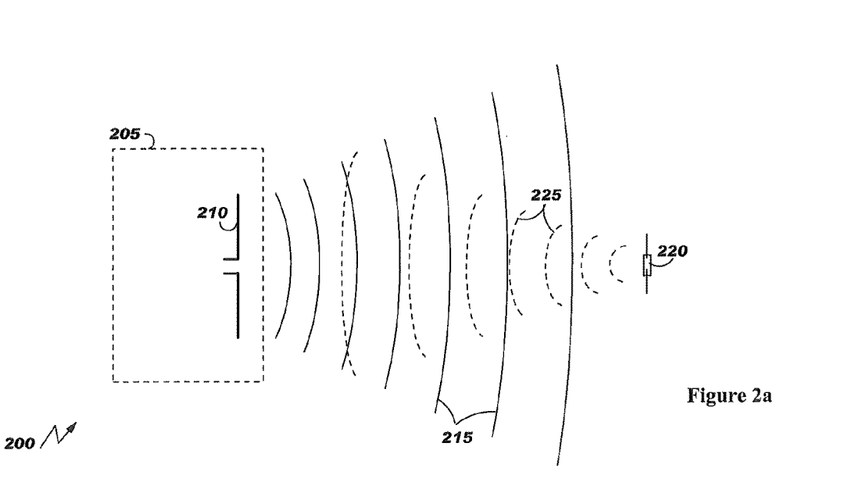
FIG. 2a shows an RFID system with a reader having an antenna and an RFID tag having a dipole antenna.
Figure 2B:
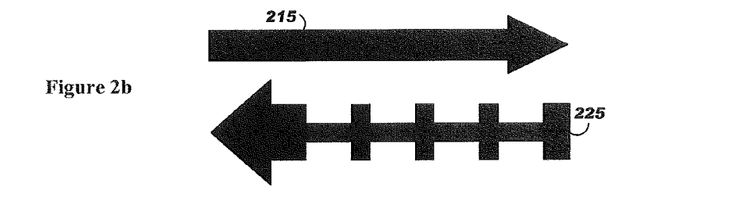
FIG. 2b illustrates the signal emitted by the antenna of the reader and the modulated signal reflected by the RFID tag.

FIG. 2, comprising FIGS. 2a and 2b, shows an RFID system 200. The RFID system 200 comprises: a reader 205 having an antenna 210, a computer coupled to the RFID reader, and a tangible computer readable storage medium comprising instructions that when implemented by the computer perform the methods of the disclosed invention. The antenna 210 emits a signal 215 that is received by an RFID tag 220. Signal 215 is reflected in RFID tag 220 and re-emitted as illustrated with dotted lines referred to as 225. FIG. 2b illustrates the signal 215 emitted by the antenna 210 of the reader 205 and the signal 225 reflected by the RFID tag 220. As shown on FIG. 2b, the reflected signal 225 is modulated.

Behavior of the RFID Embedded within an Item

As mentioned above, each RFID used for authenticating an item comprises an integrated circuit implementing a memory for storing a unique identifier referred to as MyId, a secret key referred to as SK, and a built-in function H returning H(x) when being fed with variable x, H(x) being the hashing of the input variable x according to algorithms such as "The MD5

Message-Digest Algorithm" RFC 1321 from R.Rivest or "Secure Hash Algorithm 1" RFC 3174.

Figure 3:
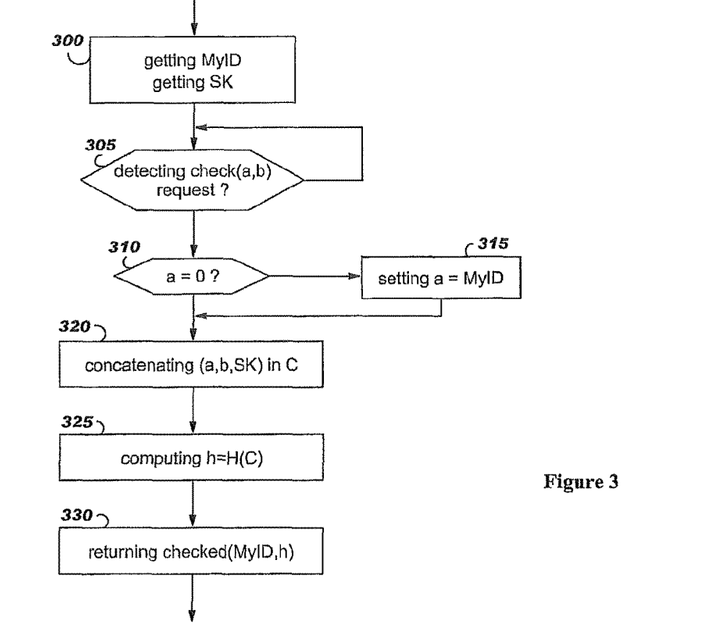
FIG. 3 is a flow chart diagram illustrating the logic operating in the RFIDs attached to the items to be authenticated, according to the method of the invention.

Each RFID, upon reception of a request for operation within its operating frequency range, operates according to the logic shown on the flow chart diagram of FIG. 3. When activated, the RFID is initialised and it gets its identifier MyId and the stored secret key SK from its memory (step 300). Then, the RFID waits until the reception of a check request having a and b as parameters (step 305). If parameter a is equal to zero (step 310), parameter a is set to MyId (step 315) i.e., the value of the RFID's identifier. The value of parameters a and b are then concatenated with the secret key SK in variable C (step 320). When concatenated, the result C is used as the input of the built-in hashing function that output is referred to as h (step 325). The RFID's identifier MyId and the result h of the built-in hashing function are then returned by the RFID in a checked command (step 330).

Method for Tagging the Items to be Authenticated

When an item should be authenticated according to the method of the invention, it should comprise an RFID as the one described by reference to FIG. 3. A genuine item must be given to the agency or organism that will authenticate the items for comparison purpose.

Figure 4:
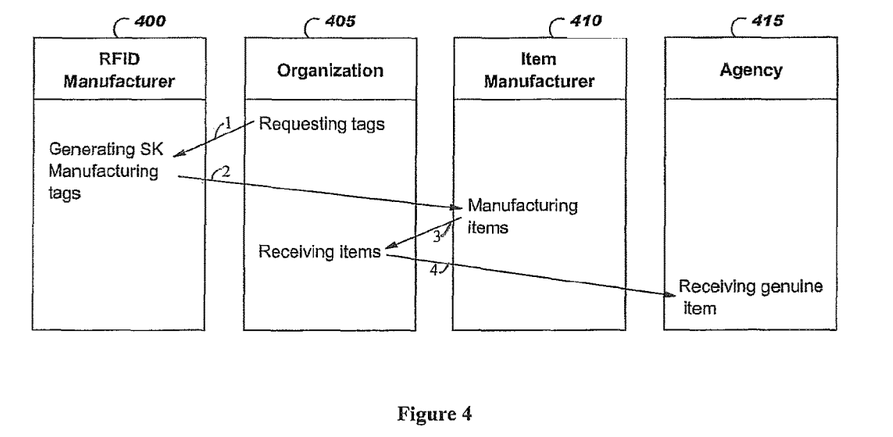
FIG. 4 illustrates the main steps for preparing the items to be authenticated.

FIG. 4 illustrates the main steps for preparing the items to be authenticated. It involves four parties: an RFID's manufacturer (400), the organisation distributing the items to be authenticated (405), the item's manufacturer (410), and the agency or organism that will authenticate the items (415). Depending upon the items, the item's manufacturer can be the organisation distributing the items to be authenticated and/or the RFID's manufacturer can be the item's manufacturer and/or the organisation distributing the items to be authenticated. Before selling or giving the items to be authenticated, the organisation 405 distributing the items transmits a request for RFIDs, as the ones described by reference to FIG. 3, to the RFID's manufacturer 400, as shown with arrow having the reference 1. If a secret key does not already exists for this organisation 405, a secret key is generated. Such secret key can be generated by a specialised company. The RFIDs are then manufactured by the RFID's manufacturer according to the specifications mentioned above, using the secret key associated to the organisation 405. The RFID's identifiers are determined according to standard methods e.g., continuous numbering. The RFIDs are then shipped to the item's manufacturer 410 which integrates them into the items, as shown with arrow having the reference 2. The items comprising the RFIDs are then transmitted to the organisation 405, as shown with arrow having the reference 3. The organisation 405 gives one genuine item to the agency or organism 415 that will authenticate the items by comparing the items with the received genuine item, as shown with arrow having the reference 4.

Method for Authenticating an Item

Figure 5:
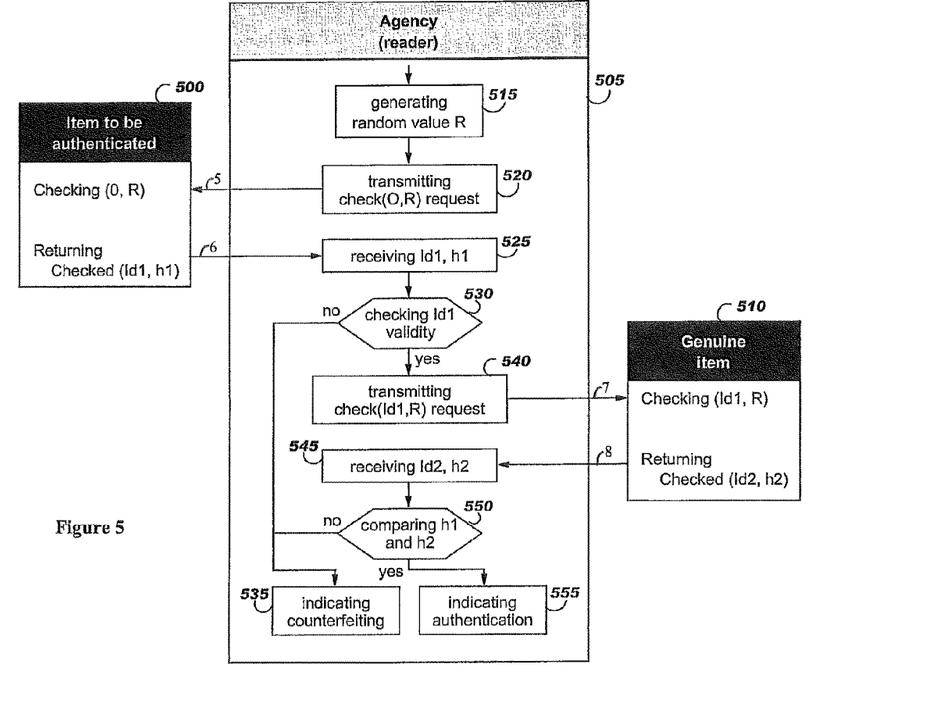
FIG. 5 depicts the method of the invention for authenticating an item, based upon the comparison of the item RFID's response with the RFID's response of a genuine item.

The method of the invention for authenticating an item is based upon the comparison of the item RFID's response with the RFID's response of a genuine item, as illustrated on FIG. 5. For authenticating an item 500, the agency 505 uses an RFID reader connected to a computer, a portable computer, a hand-held device, or the like, running the algorithm of the authenticating method. The item 500 is compared to the genuine item 510. After having generated a random number R according to a standard algorithm (step 515), the reader transmits a check request to the item to be authenticated (step 520), with arguments zero and R, as illustrated with arrow having the reference 5. As mentioned above by reference to FIG. 3, the RFID of the item to be authenticated concatenates the RFID's identifier, referred to as Id1, the random number R, and the secret key stored within the RFID, and computes the result h1 of the built-in hashing function having this concatenated value as input. Result h1 and the RFID's identifier are returned by the RFID in the checked command, as illustrated with arrow having the reference 6.

After receiving the checked command with values Id1 and h1 (step 525), the reader performs a first authentication using the returned RFID's identifier Id1 (step 530). Such authentication can be done, for example, by comparing the RFID's identifier Id1 with the organisation RFID's identifiers that can be stored in a database. If the item is not authenticated, an alert is transmitted to the user (step 535) and the authentication process is stopped. In the given example, the user is informed of counterfeiting. Such alert can be done, for example, through a display or speaker. On a display, the alert can be done with textual display such as "counterfeiting item", and/or using a predetermined colour such as a red led. Using a speaker, the alert can be done with voice synthesis such as pronouncing "counterfeiting item", and/or using a predetermined sound. If the item is authenticated, the reader transmits a check request to the genuine item (step 540), with arguments Id1 and R, as illustrated with arrow having the reference 7. As mentioned above by reference to FIG. 3, the RFID of the genuine item concatenates the item RFID's identifier Id1, the random number R, and the secret key stored within the RFID, and computes the result h2 of the built-in hashing function having this concatenated value as input. Result h2 and the RFID's identifier Id2 are returned by the RFID in the checked command, as illustrated with arrow having the reference 8. After receiving the checked command with values Id2 and h2 (step 545), the reader compares the values h1 and h2 (step 550). If h1 is equal to h2, the item is authenticated else, if h1 is different than h2, the item is counterfeiting. This authentication status is indicated to the user (step 535 or 555). If the item is not authenticated, the user is forewarned as described above (step 535). If the item is authenticated, an alert is transmitted to the user (step 555). Again, such alert can be done, for example, through a display or a speaker. On a display, the alert can be done with textual display such as "Authenticated item", and/or using a predetermined colour such as a green led. Using a speaker, the alert can be done with voice synthesis such as pronouncing "authenticated item", and/or using a predetermined sound, different than the predetermined sound characterising a counterfeiting item.

Figure 6:
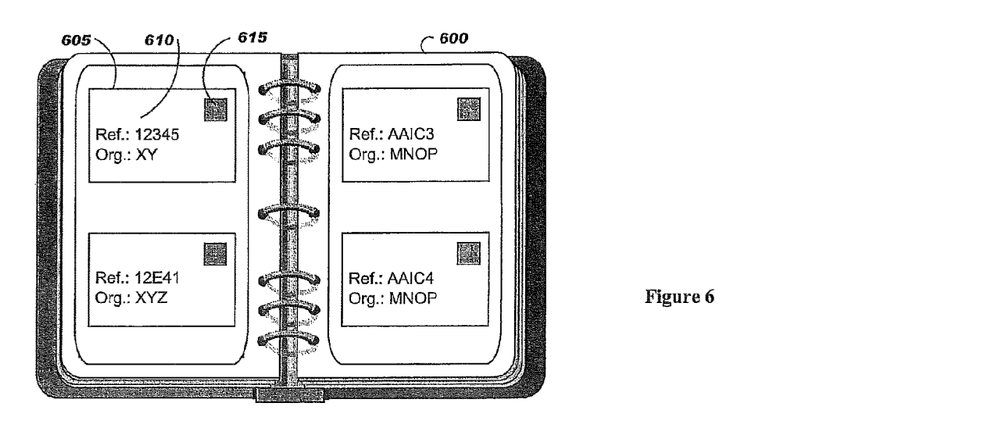
FIG. 6 is a book comprising the references and the RFIDs of genuine items, used for authenticating items without requiring the complete genuine items.

As it will be obvious for the one skilled in the art in view of the present invention, the complete genuine item is not required for the comparison, only its RFID can be used. For sake of simplicity, the agency can create a kind of book comprising all the RFIDs of the genuine items to be authenticated as shown on FIG. 6. The book 600 comprises a plurality of pages and, on each page, one or several areas 605. Each area 605 comprises at least the genuine item's reference 610 and the genuine item's RFID 615, characterising a particular genuine item.

The main advantage and characteristic of the disclosed invention relates to the fact that the authentication is done by using a randomly generated number for proofing that the suspicious object includes an RFID tag hosting the secret key SK. Any malicious people would have to visit the whole set of randomly generated numbers to be able to build an RFID answering the expected result for any value of the input. With a random number range that is large enough, this would ask for a memory size which is not compatible with what an RFID tag can host.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for identifying an authentication status of a first item through use of an algorithm configured to be executed within a first Radio Frequency Identifier (RFID) tag associated with the first item and configured to be executed within a second RFID tag associated with a second item that is a genuine representation of the first item, wherein the algorithm performs: receiving a first parameter as a first input and a second parameter as a second input; forming a concatenation (C) of a parameter value, the second parameter, and a key value; computing a hash (H) by applying a hashing function to the concatenation C; and returning an identifier (Id) as a first output and the hash H as a second output, wherein the algorithm determines the parameter value to be the identifier Id if the first parameter is zero or to be the first parameter if the first parameter is not zero, wherein the method is performed by an apparatus comprising an RFID reader and a computer coupled to the RFID reader, and wherein the method comprises:

said computer generating a random number (R);

after said generating the random number R, said RFID reader transmitting zero (0) and the random number R from the RFID reader to the first RFID tag, wherein algorithm in the first RFID tag is configured to be executed using the transmitted zero and random number R as the first and second parameter, respectively, a first secret key stored in the first RFID tag as the key value, and an identifier Id1 of the first RFID tag stored in the first RFID tag as the identifier Id;

after said transmitting zero and the random number R, said RFID reader receiving from the first RFID tag first data comprising the identifier Id1 and a hash (H1) consisting of the hash H computed by the algorithm as a result of the algorithm being executed in the first RFID tag;

after said receiving the first data, said computer determining that the identifier Id1 in the first data is equal to an RFID identifier of the first item stored in a database;

after determining that the identifier Id1 in the first data is equal to the RFID identifier, said RFID reader transmitting the identifier Id1 and the random number R to the second RFID tag, wherein algorithm in the second RFID is configured to be executed using the transmitted identifier Id1 and random number R as the first and second parameter, respectively, a second secret key stored in the second RFID tag as the key value, and an identifier Id2 of the second RFID tag stored in the second RFID tag as the identifier Id;

after said transmitting the identifier Id1 and the random number R, said RFID reader receiving from the second RFID tag second data comprising the identifier ID2 and a hash (H2) consisting of the hash H computed by the algorithm as a result of the algorithm being executed in the second RFID tag;

after said receiving the second data, said computer determining the authentication status of the first item by ascertaining whether H1 is equal to H2 and subsequently determining that the authentication status is that the first item is authentic or counterfeit if said ascertaining has ascertained that H1 is equal to H2 or that H1 is unequal to H2, respectively;

said computer communicating the authentication status to a user.

2. The method of claim 1, wherein said ascertaining ascertains that H1 is equal to H2.

3. The method of claim 1, wherein said ascertaining ascertains that H1 is unequal to H2.

4. The method of claim 1, wherein the second item comprises the second RFID while the method is being performed.

5. The method of claim 4, wherein the secret key is associated with an organization that sent a request to an RFID manufacturer to manufacture the first RFID and transmit the first RFID to an item manufacturer, wherein the organization had received the first item comprising the first RFID from the item manufacturer and had transmitted the received the first item comprising the first RFID to an agency that uses the apparatus to perform the method.

6. The method of claim 1, wherein while the method is being performed the second item does not comprise the second RFID, wherein while the method is being performed the second RFID is in a book that comprises a plurality of RFIDs respectively associated with a plurality of items to be authenticated, wherein the plurality of RFIDs comprises the second RFID, wherein each RFID of the plurality of RFIDs is in a respective area on a page of a plurality of pages in the book, and wherein each respective area comprises an RFID of the plurality of RFIDs associated with a unique item of the plurality of items and further comprises a reference pertaining to the unique item.

7. The method of claim 1, wherein said communicating the authentication status comprises displaying text indicative of the authentication status, displaying a color indicative of the authentication status, or sounding an alert indicative of the authentication status.

8. A system comprising an apparatus, said apparatus comprising an RFID reader, a computer coupled to the RFID reader, and a tangible computer readable storage medium comprising instructions that when implemented by the computer perform a being authentic or counterfeit through use of an algorithm configured to be executed within a first Radio Frequency Identifier (RFID) tag associated with the first item and configured to be executed within a second RFID tag associated with a second item that is a genuine representation of the first item, wherein the algorithm performs: receiving a first parameter as a first input and a second parameter as a second input; forming a concatenation (C) of a parameter value, the second parameter, and a key value; computing a hash (H) by applying a hashing function to the concatenation C; and returning an identifier (Id) as a first output and the hash H as a second output, wherein the algorithm determines the parameter value to be the identifier Id if the first parameter is zero or to be the first parameter if the first parameter is not zero, and wherein the method comprises:

said computer generating a random number (R);

after said generating the random number R, said RFID reader transmitting zero (0) and the random number R from the RFID reader to the first RFID tag, wherein algorithm in the first RFID tag is configured to be executed using the transmitted zero and random number R as the first and second parameter, respectively, a first secret key stored in the first RFID tag as the key value, and an identifier Id1 of the first RFID tag stored in the first RFID tag as the identifier Id;

after said transmitting zero and the random number R, said RFID reader receiving from the first RFID tag first data comprising the identifier Id1 and a hash (H1) consisting of the hash H computed by the algorithm as a result of the algorithm being executed in the first RFID tag;

after said receiving the first data, said computer determining that the identifier Id1 in the first data is equal to an RFID identifier of the first item stored in a database;

after determining that the identifier Id1 in the first data is equal to the RFID identifier, said RFID reader transmitting the identifier Id1 and the random number R to the second RFID tag, wherein algorithm in the second RFID is configured to be executed using the transmitted identifier Id1 and random number R as the first and second parameter, respectively, a second secret key stored in the second RFID tag as the key value, and an identifier Id2 of the second RFID tag stored in the second RFID tag as the identifier Id;

after said transmitting the identifier Id1 and the random number R, said RFID reader receiving from the second RFID tag second data comprising the identifier ID2 and a hash (H2) consisting of the hash H computed by the algorithm as a result of the algorithm being executed in the second RFID tag;

after said receiving the second data, said computer determining the authentication status of the first item by ascertaining whether H1 is equal to H2 and subsequently determining that the authentication status is that the first item is authentic or counterfeit if said ascertaining has ascertained that H1 is equal to H2 or that H1 is unequal to H2, respectively;

said computer communicating the authentication status to a user.

9. The system of claim 8, wherein said ascertaining ascertains that H1 is equal to H2.

10. The system of claim 8, wherein said ascertaining ascertains that H1 is unequal to H2.

11. The system of claim 8, wherein the second item comprises the second RFID while the method is being performed.

12. The system of claim 11, wherein the secret key is associated with an organization that sent a request to an RFID manufacturer to manufacture the first RFID and transmit the first RFID to an item manufacturer, wherein the organization had received the first item comprising the first RFID from the item manufacturer and had transmitted the received the first item comprising the first RFID to an agency that uses the apparatus to perform the method.

13. The system of claim 8, wherein while the method is being performed the second item does not comprise the second RFID, wherein while the method is being performed the second RFID is in a book that comprises a plurality of RFIDs respectively associated with a plurality of items to be authenticated, wherein the plurality of RFIDs comprises the second RFID, wherein each RFID of the plurality of RFIDs is in a respective area on a page of a plurality of pages in the book, and wherein each respective area comprises an RFID of the plurality of RFIDs associated with a unique item of the plurality of items and further comprises a reference pertaining to the unique item.

14. The system of claim 8, wherein said communicating the authentication status comprises displaying text indicative of the authentication status, displaying a color indicative of the authentication status, or sounding an alert indicative of the authentication status.

15. A tangible computer readable storage medium comprising instructions that when implemented by a computer perform a method for identifying an authentication status of a first item through use of an algorithm configured to be executed within a first Radio Frequency Identifier (RFID) tag associated with the first item and configured to be executed within a second RFID tag associated with a second item that is a genuine representation of the first item, wherein the algorithm performs: receiving a first parameter as a first input and a second parameter as a second input; forming a concatenation (C) of a parameter value, the second parameter, and a key value; computing a hash (H) by applying a hashing function to the concatenation C; and returning an identifier (Id) as a first output and the hash H as a second output, wherein the algorithm determines the parameter value to be the identifier Id if the first parameter is zero or to be the first parameter if the first parameter is not zero, wherein an apparatus comprises an RFID reader and the computer coupled to the RFID reader, and wherein the method comprises:

said computer generating a random number (R);

after said generating the random number R, said RFID reader transmitting zero (0) and the random number R from the RFID reader to the first RFID tag, wherein algorithm in the first RFID tag is configured to be executed using the transmitted zero and random number R as the first and second parameter, respectively, a first secret key stored in the first RFID tag as the key value, and an identifier Id1 of the first RFID tag stored in the first RFID tag as the identifier Id;

after said transmitting zero and the random number R, said RFID reader receiving from the first RFID tag first data comprising the identifier Id1 and a hash (H1) consisting of the hash H computed by the algorithm as a result of the algorithm being executed in the first RFID tag;

after said receiving the first data, said computer determining that the identifier Id1 in the first data is equal to an RFID identifier of the first item stored in a database;

after determining that the identifier Id1 in the first data is equal to the RFID identifier, said RFID reader transmitting the identifier Id1 and the random number R to the second RFID tag, wherein algorithm in the second RFID is configured to be executed using the transmitted identifier Id1 and random number R as the first and second parameter, respectively, a second secret key stored in the second RFID tag as the key value, and an identifier Id2 of the second RFID tag stored in the second RFID tag as the identifier Id;

after said transmitting the identifier Id1 and the random number R, said RFID reader receiving from the second RFID tag second data comprising the identifier ID2 and a hash (H2) consisting of the hash H computed by the algorithm as a result of the algorithm being executed in the second RFID tag;

after said receiving the second data, said computer determining the authentication status of the first item by ascertaining whether H1 is equal to H2 and subsequently determining that the authentication status is that the first item is authentic or counterfeit if said ascertaining has ascertained that H1 is equal to H2 or that H1 is unequal to H2, respectively;

said computer communicating the authentication status to a user.

16. The storage medium of claim 15, wherein said ascertaining ascertains that H1 is equal to H2.

17. The storage medium storage device of claim 15, wherein said ascertaining ascertains that H1 is unequal to H2.

18. The storage medium of claim 15, wherein the second item comprises the second RFID while the method is being performed.

19. The storage medium of claim 18, wherein the secret key is associated with an organization that sent a request to an RFID manufacturer to manufacture the first RFID and transmit the first RFID to an item manufacturer, wherein the organization had received the first item comprising the first RFID from the item manufacturer and had transmitted the received the first item comprising the first RFID to an agency that uses the apparatus to perform the method.

20. The storage medium of claim 15, wherein while the method is being performed the second item does not comprise the second RFID, wherein while the method is being performed the second RFID is in a book that comprises a plurality of RFIDs respectively associated with a plurality of items to be authenticated, wherein the plurality of RFIDs comprises the second RFID, wherein each RFID of the plurality of RFIDs is in a respective area on a page of a plurality of pages in the book, and wherein each respective area comprises an RFID of the plurality of RFIDs associated with a unique item of the plurality of items and further comprises a reference pertaining to the unique item.

\* \* \* \* \*